Dec. 17, 1929.   J. M. CROWE   1,740,074
PORTABLE POWER HANDSAW
Filed April 29, 1926   2 Sheets-Sheet 1

Inventor
John M. Crowe
By Brockett & Hyde
Attorneys

Dec. 17, 1929.  J. M. CROWE  1,740,074
PORTABLE POWER HANDSAW
Filed April 29, 1926  2 Sheets-Sheet 2

Inventor
John M. Crowe
By Brockett + Hyde
Attorneys

Patented Dec. 17, 1929

1,740,074

UNITED STATES PATENT OFFICE

JOHN M. CROWE, OF COVINGTON, KENTUCKY, ASSIGNOR TO THE CROWE MANUFAC-
TURING CORPORATION, OF CINCINNATI, OHIO, A CORPORATION OF KENTUCKY

PORTABLE POWER HANDSAW

Application filed April 29, 1926. Serial No. 105,417.

This invention relates to portable power hand saws and generally has for its object improvements in the saw described in my patent for portable motor driven saw, Patent No. 1,644,326, granted Oct. 4, 1927.

Specifically this invention embraces an improved handle arrangement wherein one of the handles forms a supporting means for the fixed saw guard, improved and more complete means for guarding the saw, improved arrangement of parts in the saw mounting, and improved means for controlling the movable saw guard or gauge.

Figure 1:
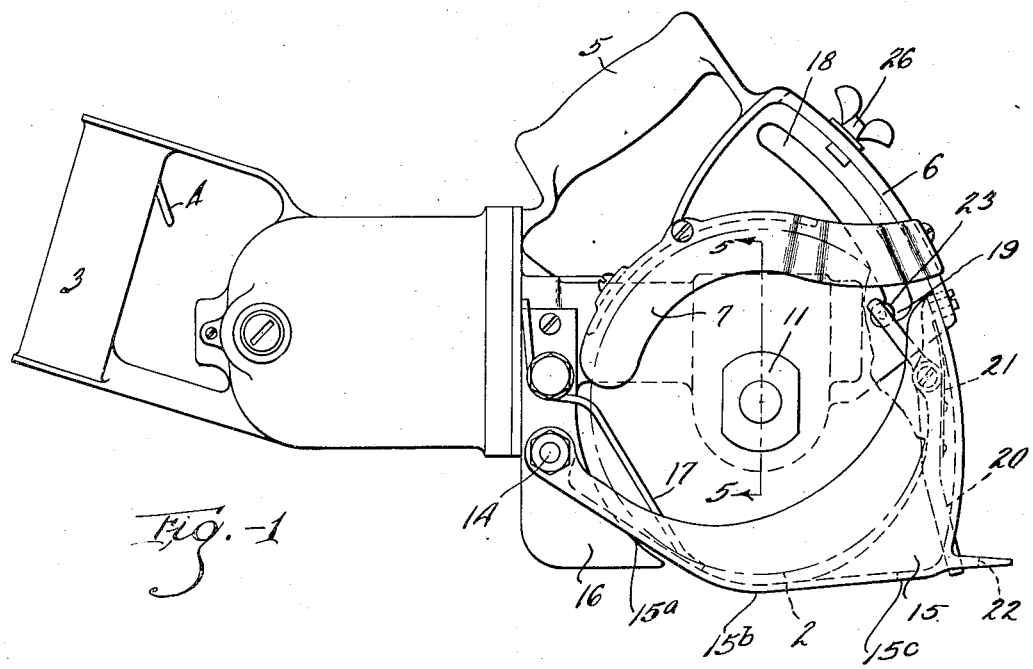
Figure 2:
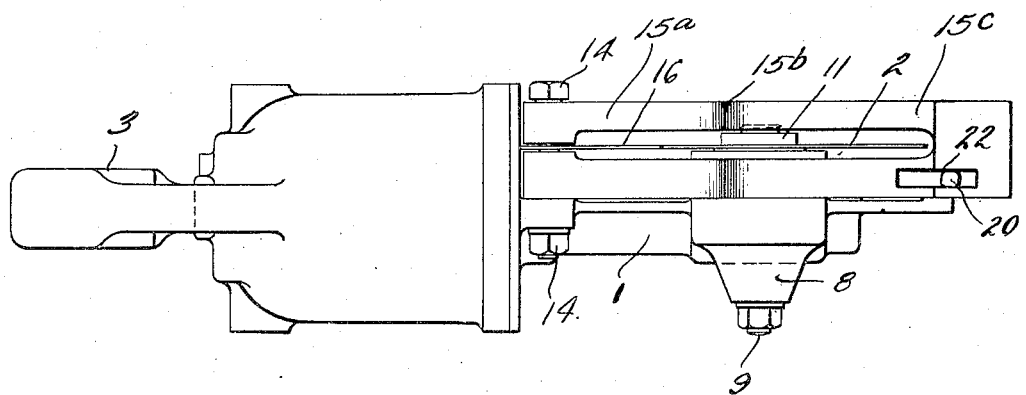
Figure 4:
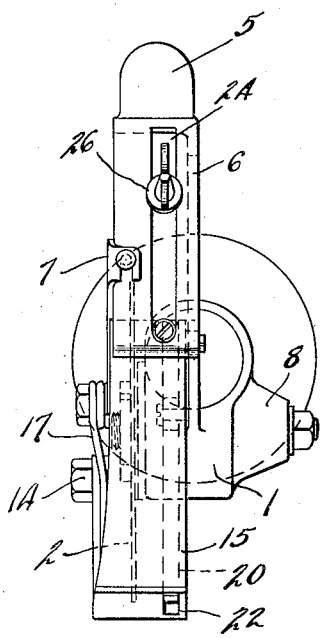
Figure 3:
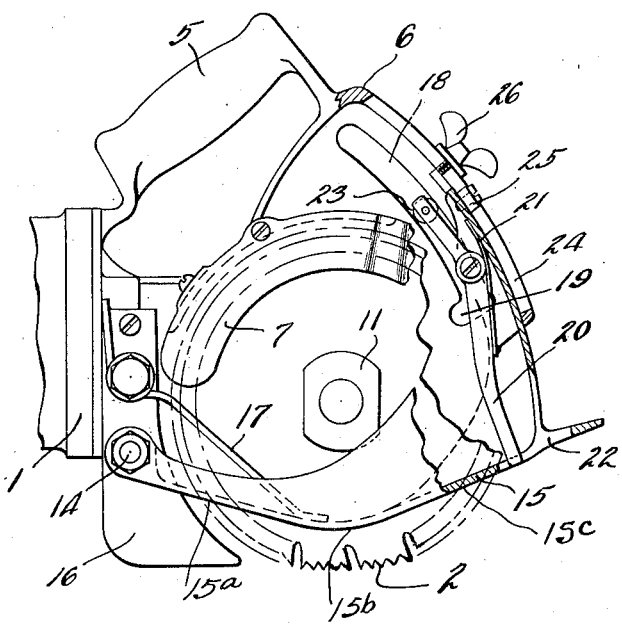
Figure 5:
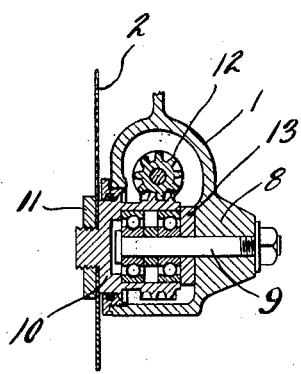

The exact nature of these improvements will be apparent from the following description taken with reference to the accompanying drawings in which Fig. 1 is a side view of the saw showing the gauge in position whereby the saw is completely guarded; Fig. 2 is a bottom view of the same saw; Fig. 3 is a detailed view of the pertinent parts of the saw shown in Fig. 1 in sawing position; Fig. 4 is an end view of Fig. 1; and Fig. 5 is a sectional detail along the line 5—5 of Fig. 1.

The principal parts of the saw are a frame generally indicated by the reference numeral 1 containing a driving motor suitably connected as through a pair of helical gears with the saw blade 2 which is mounted for rotation in the frame in the manner to be described; the upper portion of the frame extending around the upper portion of the saw blade to form a guard for the same, and the rear portion of the frame extending to form a handle 3, concealed within which is a switch controlled through the trigger 4 whereby the motor and therefore the saw may be started and stopped at will.

In my invention I provide a second handle 5 formed by extending a member of the frame between the base of the frame in which the motor is located, and that part of the frame forming the fixed guard hereinafter referred to as merely the guard 6. This arrangement of the handles nicely balances the saw in the hands of the operator, and the handle 5 greatly strengthens the guard 6, which is necessarily of somewhat light construction. Thus the blade, frame, and motor may be tilted as a unit upon the runner as a base resting on the work, the handle 5 being adjacent the blade and forward of the pivot whereby bodily and tilting movements of the blade will accompany that of the handle, and the handle 3 being rearward of the pivot whereby the work-engaging surface of the runner may be nicely maintained upon the work, and the tool may be nicely balanced between the handles. The guard 6 extends to the center of the saw blade upon one side as appears in Fig. 4, and surrounds approximately the upper 180 degrees of the cutting edge. In order to protect the corresponding portion of the blade upon the other side I provide an auxiliary guard member 7 removable to allow removal of the blade when desired; and which serves also to strengthen the guard 6.

The frame extends forward of the motor beneath the guard 6, to the center of the blade, forming the saw support, and a housing for the driving connections between the motor and the blade. A substantial boss 8 is formed upon the frame opposite the center of the blade and in which is secured a pin 9 extending within the housing. The blade is secured upon an arbor 10 by means of the nut 11. The arbor is hollow and extends into the frame housing about the pin 9, and is arranged to bear upon the pin for rotation thereabout as by the provision of the ball bearings shown in Fig. 5. About the portion of the arbor thus surrounding the pin 9 are cut gear teeth adapted to be engaged by corresponding teeth upon a gear 12 carried by the motor driven shaft, whereby the blade is caused to rotate upon actuation of the motor. This mounting arrangement for the saw is very compact, yet allows the employment of substantial and relatively large ball bearings, as shown; and by cutting teeth directly upon the arbor a considerable saving in material and hence in dimension is effected. A thrust bearing member 13 may be provided between the frame and the arbor and the motor shaft arranged to rotate in a counter-clockwise direction, Fig. 5. A sleeve, and in connection therewith suitable packing means may be provided at the blade side of the housing immediately surrounding the arbor.

Fixed means for completely guarding approximately the upper half of the blade have been described.

Pivotally mounted as upon an axis such as the bolt 14, and movable upon the guard 6 is the runner or movable gauge and guard member 15 having its lower surface formed with two flat portions 15ᵃ and 15ᶜ, joined by a bent portion 15ᵇ therebetween, the surface being slotted to clear the saw blade 2 and the kerf blade 16 when moved upwardly from the position shown in Fig. 1. The bent portion 15ᵇ is so located along the surface of which it forms a part that as the member 15 swings about bolt 14, the bent portion will move substantially radial of the saw blade. The member 15 cooperates with the guards described to completely protect all cutting portions of the blade not projecting into the work; and when moved upwardly as to the position shown in Fig. 3, its lower surface engaging the work being sawed, acts as a gauge in a manner which will be described; and this will be understood, although hereinafter the member may be referred to merely as a runner.

The runner 15 is urged by the spring 17 to the position shown in Fig. 1, hereinafter referred to as the guarding position, and is normally retained in this position by the following means; along the side of the guard 6 extends an arcuate slot 18, its lower end terminating in a notch 19; mounted upon the runner is a lever 20, the upper arm of which carries a projection, as the roller 23 shown, adapted to follow the slot 18 upon movement of the gauge, and caused to enter the notch by means of spring 21, upon movement of the runner to guarding position, whereby the runner is secured. The lower arm of the lever extends in this position of the parts through a slot 22 in the flat surface portion 15ᶜ of the runner, projecting somewhat beyond the surface as appears in Fig. 1. Thus upon engagement of the runner with the work and forward movement thereon the projecting tip of the lever will be engaged by the work to move the lever and remove the roller 23 from the notch 19 allowing the runner to travel upwards to uncover the blade through the slot and into the work.

In order to adjustably limit the relative upward motion of the runner, and thereby the depth of the cut of the saw, the following means are provided; through the outer portion of the guard 6 is cut a slot 24 in which slides a cooperating projection as the roller 25, upon the upper corresponding portion of the runner. Within this slot is adjustably secured a bolt by a wing nut 26. It will be obvious that the projection 25 can move no farther upward than to an abutting position against the bolt and nut 26 which thus forms a stop limiting motion of the runner whereby the depth of saw cut may be predetermined. The cooperating slot and projection serve as well to steady the free end of the runner, the whole arrangement resulting in a more dependable functioning of the parts than has heretofore been accomplished in the art.

In operation, once the runner has been released from guarding position by the means described, the blade may be pushed into the work by the handle 5 and the tool advanced along the work as desired, the tool being steadied by the bearing of the bent runner portion 15ᵇ against the work. The parts are thus altered in their relationship, from the showing of Fig. 1 to that of Fig. 3. By the above described location of the bent portion 15ᵇ, tilting motion of the tool about its bearing against the work will be substantially without effect upon the depth of the cut, and when a maximum cut is desired the runner may move upwardly until the saw arbor and adjacent parts are nested within the bent portion.

What I claim is:

1. In a power driven hand tool adapted to be slid along the work, a frame, a cutting blade operatively mounted thereon, a motor on said frame rearward of said blade, a guard fixed on said frame for guarding a portion of said blade, a combined guard and gauge pivotally mounted to advance or retreat in overlapping relation with said fixed guard to guard or expose a cutting portion of said blade, and having a work engaging surface, one of said guards having a slot, the other of said guards having a pin, said pin and slot being arranged for relative movement to guide and support movable guard in all positions thereof, a stop adjustably securable in said slot for limiting movement of said pin therein, to limit the retreating movement of said movable guard, a latch on said movable guard, said fixed guard having a slot notched for engagement by said latch in fully advanced position of said movable guard, said latch extending beyond said surface in said advanced position and being adapted to recede from said notch upon engagement with the work.

2. In a power driven hand tool adapted to be slid along the work, a frame, a cutting blade operatively mounted thereon, a motor on said frame rearward of said blade, a guard fixed on said frame for guarding a portion of said blade, a combined guard and gauge pivotally mounted to advance or retreat in overlapping relation with said fixed guard to guard or expose a cutting portion of said blade, and having a work engaging surface, one of said guards having a slot, the other of said guards having a pin, said pin and slot being arranged for relative movement to guide and support the movable guard in all positions thereof, a stop adjustably securable in said slot for limiting movement of said pin therein to limit the retreating movement of said movable guard, a latch on said movable guard, said fixed guard having a slot notched for engagement by said latch in fully advanced position of said movable guard, said latch extending beyond said surface in said advanced position and being adapted to recede from said notch upon engagement with the work, said first named slot lying in the forward surface, said fixed guard and said notched slot lying in a lateral surface thereof.

3. In a portable power-driven hand-tool adapted to be applied bodily to the work and moved therealong, a runner having a work-engaging surface, a frame having pivotal connection with the runner, a cutting blade mounted forwardly on said frame, a motor rearward of said blade and having operative connection therewith, whereby said blade, frame, and motor may tilt as a unit upon said runner, and a handle on said frame adjacent said blade and forward of said pivot whereby bodily and tilting blade movements will accompany those of said handle.

4. In a portable power-driven hand-tool adapted to be applied bodily to the work and moved therealong, a frame having a cutting blade mounted forwardly thereof and a motor, rearward thereof and having operative connection with said blade, a runner having a work-engaging surface, said frame having medial of its length, pivotal connection with the runner whereby said frame, blade, and motor, may tilt as a unit upon the runner, and a pair of handles for said tool associated with said unit, one arranged adjacent said blade and forward of said pivot, and the other arranged adjacent said motor and rearward of said pivot, whereby bodily and tilting movements of the blade will accompany those of said handle, and relative movement of the parts about said connection may be controlled.

5. In a portable power-driven hand-tool adapted to be applied bodily to the work and moved therealong, a frame and a cutting blade mounted forwardly thereof and a motor rearward thereof and having operative connection with said blade, a runner having a work-engaging surface, said parts being arranged generally in a plane, said frame having medially of its length pivotal connection with the runner whereby said frame, blade, and motor, may tilt as a unit upon the runner, such relative movement of the parts being in said plane, and a pair of handles for said tool associated with said unit and arranged in said plane, one adjacent said blade and forward of said pivot, and the other adjacent said motor and rearward of said pivot whereby bodily and tilting movements of said blade will accompany those of said handle, and relative movement of said parts about said connection may be controlled and the tool will be balanced between said handles.

In testimony whereof I hereby affix my signature.

JOHN M. CROWE.